United States Patent [19]

Shreve

[11] 4,241,351

[45] Dec. 23, 1980

[54] ARRAY ANTENNA CONTROLLER

[75] Inventor: James S. Shreve, Fairfax, Va.

[73] Assignee: The United States of America as represented by the Secretary of the Army, Washington, D.C.

[21] Appl. No.: 29,421

[22] Filed: May 11, 1979

[51] Int. Cl.³ .......... H04B 7/00

[52] U.S. Cl. .......... 343/100 SA

[58] Field of Search .......... 343/100 CL, 100 SA, 343/854, 5 FT, 9 PS

[56] References Cited

U.S. PATENT DOCUMENTS 4,119,969 10/1978 Barton .......... 343/100 SA

*Primary Examiner*—Theodore M. Blum

*Attorney, Agent, or Firm*—Nathan Edelberg; Robert P. Gibson; Saul Elbaum

[57] ABSTRACT

A coherent optical processor antenna controller for controlling the pattern emitted by an array antenna. Since the amplitude and phase of the antenna excitation signals are related to the far field by the Fourier transform function, a coherent optical processor, which uses lenses to take the Fourier transforms of images may be used to control the antenna excitation. The shape and direction of the pattern may be controlled by the transmittance distribution of a transparency in the processor and a null may be formed by the utilization of an additional slide.

7 Claims, 11 Drawing Figures

ARRAY ANTENNA CONTROLLER

RIGHTS OF THE GOVERNMENT

The invention described herein may be manufactured, used, and licensed by or for the United States Government for governmental purposes without the payment to me of any royalty thereon.

The present invention is directed to a coherent optical processor antenna controller.

It is frequently desirable to change the direction and/or shape of antenna patterns. In the prior art, change in pattern direction has been effected either by physically moving the antenna, or in the case of digital computer control of a phased array, by the use of phase shifters. Generally, however, it has not been possible to change the beam shape of the pattern emitted by a phased array under digital computer control in a practical fashion.

The present invention relates to a new apparatus for controlling array antenna patterns, and involves the use of a coherent optical processor. Since the amplitude and phase of the electrical signals with which the antenna elements are excited are related to the far field produced by the antenna by the Fourier transform function, coherent optical processing, which involves taking the Fourier transform of optical images, may be used to program the antenna element excitation signals to appropriately control the antenna pattern.

Unlike in the prior art techniques of antenna control, the shape of the pattern as well as its direction may be controlled. And, since in the system of the invention, beam direction is dependent only upon the relative displacement of a transparency, the direction can be controlled easily and conveniently.

It is thus an object of the invention to provide a coherent optical processor antenna controller.

It is a further object of the invention to provide an antenna controller which can expeditiously change the shape of the pattern emitted from an array antenna.

It is still a further object of the invention to provide an antenna controller which can easily and conveniently change the direction of the pattern emitted from an array antenna without physically moving the antenna.

It is still a further object of the invention to provide an antenna controller which is capable of inserting nulls in the antenna patterns.

The invention will be discussed in conjunction with the accompanying drawings, as follows.

Figure 1A:
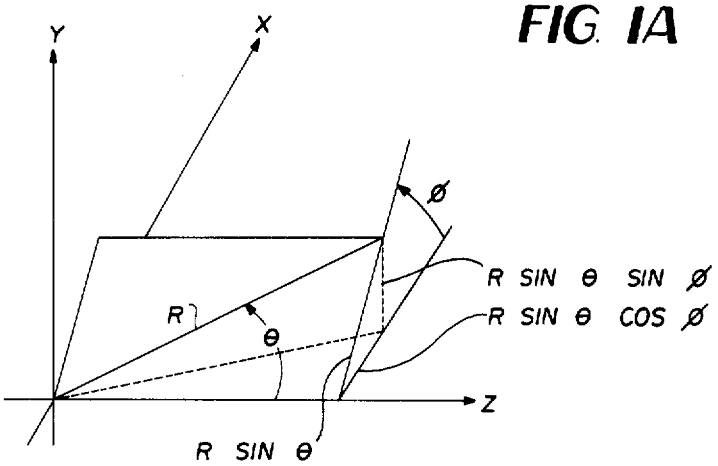
FIGS. 1A and 1B are an illustration of coordinate systems useful in understanding antenna patterns.

For ease of understanding, the specification is broken down into headings as follows:

1. General Considerations
2. General Antenna Discussion
2.1 Continuous Apertures
2.2 Arrays
3 Control Algorithims
3.1 Simple Beam Forming
3.2 General Beam Forming
3.3 Null Formation
4 Processor Considerations
4.1 Equipment Scaling
4.2 Electro-Optical Interface
4.3 Possible Refinements

1. GENERAL CONSIDERATIONS

In accordance with the invention, a coherent optical processor is applied to the task of determining the proper signals to control an array antenna in real time. This application is a logical one since the coherent optical processor performs the two-dimensional Fourier transform as a single operation.

The attainable antenna control includes the formation of single- and multiple-beam directivity patterns, and real-time beam steering and beam shape modifications. It also is possible to impose nulls in the directivity pattern at arbitrary locations, within the electrical constraints of the array antenna, and at a cost of degrading the antenna beam and sidelobes.

The coherent optical processor in this application is not exactly a scaled-down model of the antenna; the two differ in at least four respects:

First, because angular beam displacements are small in the optical processor, the processor truly exhibits a Fourier transform; for the antenna a cosine factor appears in the relationship between pattern and aperture distribution.

Second, because the processor optical wavelength is so small compared to the scaled dimensions for radiating elements and their interspacing, there is negligible interaction between elements in the processor. In the antenna, the directivity pattern of each element is modified by the presence of the surrounding elements.

Third, whatever the directivity pattern of the element may be, it must be introduced into the processor by a different means (and usually at a different place), relative to how it is introduced into the array antenna.

Fourth, the processor outputs a set of normalized element excitation values based upon a two-dimensional input function, and possibly modified by other two-dimensional constraining functions introduced separately. The array antenna forms a two-dimensional output "beam" function based upon a set of element excitation values (or control values, in receiving). It is apparent that the two devices perform inverse operations. In addition, the optical processor may accomplish its overall operation through a sequence of processes performed by a series of physical components. The dissimilarity of antenna and processor can be appreciated by examining a processor flow chart such as FIG. 4B.

It is assumed that the array antenna has provision for both amplitude and phase control of the elements.

2. GENERAL ANTENNA DISCUSSION

2.1 Continuous Apertures

When an antenna aperture is the source of a highly-directional beam that is approximately normal to the aperture, the directivity pattern and the electric or magnetic field distribution in the aperture are related by the Fourier transform. It has been shown that for the one-dimensional aperture, the aperture current distribution is the Fourier transform of the resultant antenna directivity pattern when that pattern is expressed as a function of the sine of the angle off normal to the array. Of course this extends to two-dimensional apertures, as can be seen by examining the expression for antenna directivity below:

$$E(\theta,\phi)=\int F(X,Y)\exp\left(j(2\pi/\lambda)\sin\theta\,(X\cos\phi+Y\sin\phi)\right)dXdY \tag{1}$$

where $E(\theta,\phi)$ is the directivity pattern expressed in polar coordinate form, $F(X,Y)$ is the aperture distribution, and $\lambda$ is the wavelength of the rf energy.

The transform relationship becomes apparent when the directivity pattern is expressed in terms of the direction cosines l and m, or the variables x and y which are proportional to the direction cosines. By definition $$x=l/\lambda, \text{ and} \tag{2}$$

$$y=m/\lambda. \tag{3}$$

Figure 1B:
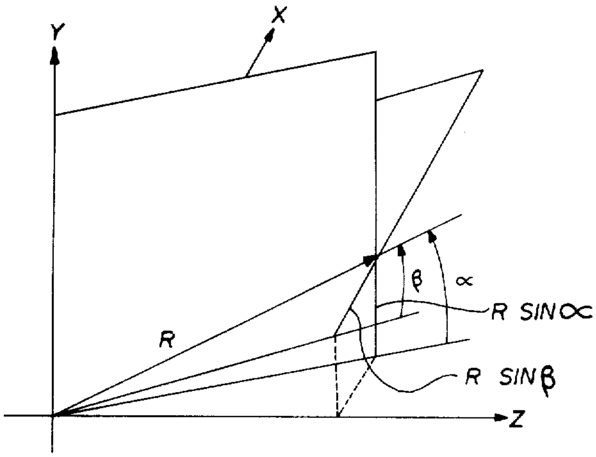

From FIG. 1 we see that $\beta$ and $\alpha$ are complements of arccos l and arccos m, and that $$x=(\sin\beta)/\gamma=(\sin\theta\cos\phi)/\lambda, \text{ and} \tag{4}$$

$$y=(\sin\alpha)/\lambda=(\sin\theta\sin\phi)/\lambda. \tag{5}$$

Therefore, $$E'(x,y)=\int\int F(X,Y)\exp\left(j2\pi(xX+yY)\right)dXdY, \text{ or}$$

$$E'(x,y)=\mathbb{F}^{-1}\{F(X,Y)\}, \tag{6}$$

where E' is the directivity pattern E expressed in terms of x and y.

Note that $E(\theta,\phi)$ is a normalized measure of field strength per unit solid angle. The function E' is also normalized field strength per unit solid angle, but expressed in a different coordinate system.

The exact relationship between aperture distribution and antenna directivity pattern, without the narrow-beam constraint, is shown to have a cosine term. Using the preceding notation, this leads to $$E'(x,y)/\cos\beta=\mathbb{F}^{-1}\{F(X,Y)\} \tag{7}$$

where it is assumed that the electric field in the aperture is constrained to have no x-component. From equation (5) we see that $\cos\beta$ is related to x, and that equation (7) can therefore be written as $$E'(x,y)/(1-\lambda^2x^2)^{\frac{1}{2}}=f(x,y) \tag{8}$$

where f(x,y) is understood to be the inverse Fourier transform of F(X,Y). Thus the directivity pattern, divided by a cosine function and expressed in the proper coordinate system, and the aperture distribution form a two-dimensional Fourier transform pair.

2.2 Arrays

Where an array of elements is used to synthesize an antenna aperture we are concerned with an aperture distribution of the form $$F_a(X,Y)=\sum_{m,n}F_w(X_m,Y_n)\cdot\left[G_{m,n}(X,Y)*\delta(X-X_m,\,Y-Y_n)\right] \tag{9.}$$

where $G_{m,n}$ is the aperture distribution appropriate for the individual array element located at $X_m$, $Y_n$. In effect we are weighting the element distributions by samples of some $F_w$ at the element locations. In the case where all of the elements behave identically, we may replace $G_{m,n}$ with a unique G and re-write the above as $$F_a(X,Y)=G(X,Y)*H(X,Y), \tag{10}$$

where $$H(X,Y)=\sum_{m,n}\delta(X-X_m,\,Y-Y_n)\cdot F_w(X_m,Y_n). \tag{11.}$$

H, which determines how the elements are weighted (in both amplitude and phase), is the control input to the actual antenna, and therefore constitutes the output from the computational device that controls the antenna. The input to the controller is the desired directivity pattern.

3. CONTROL ALGORITHMS

3.1 Simple Beam Forming

Figure 2:
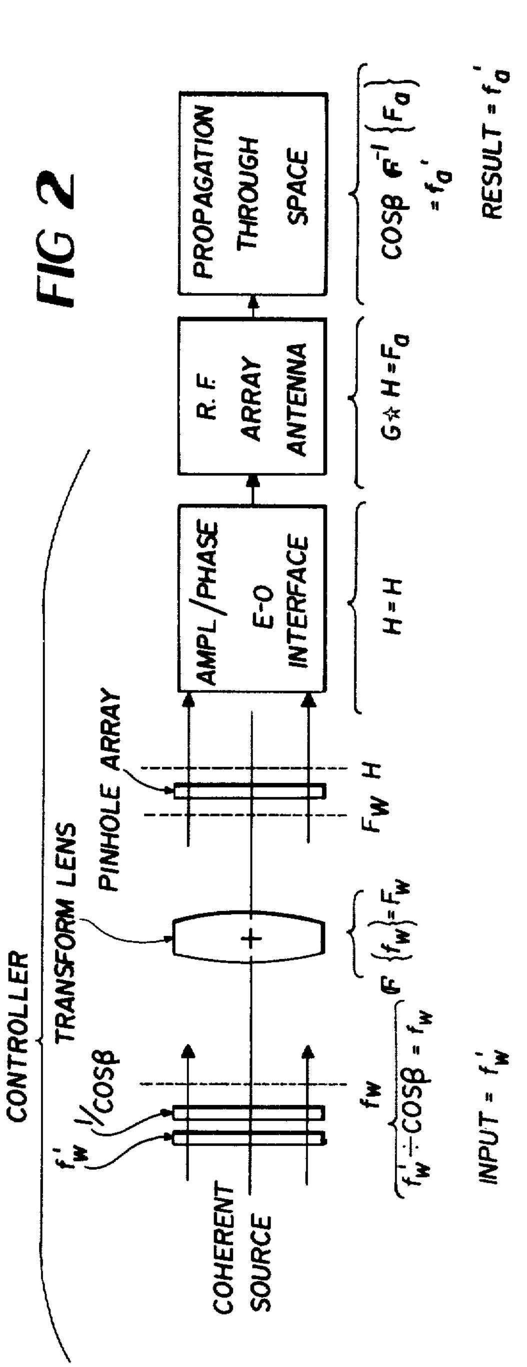
FIG. 2 is a block diagram of the simplest embodiment of the optical processor antenna controller of the invention.

If we consider G to be an interpolation function, then $F_a$ approximates the weighting function $F_w$, and the inverse transform $f_a$ approximates the inverse transform $f_w$. In a very rough first approach, $f_w\cdot\cos\beta$ could serve as the desired directivity pattern, while $f_a\cdot\cos\beta$ would be the actual pattern produced. The implementation in a coherent optical processor is shown in FIG. 2. In order to understand FIG. 2 we note the following definitions:

$$f_w\equiv\mathbb{F}^{-1}\{F_w\} \tag{12}$$

$$f_w'\equiv f_w\cdot\cos\beta \tag{13}$$

$$f_a\equiv\mathbb{F}^{-1}\{Fa\} \tag{14}$$

$$f_a'\equiv f_a\cdot\cos\beta \tag{15}$$

An input slide is prepared which serves to impress the function $f_w'$ upon the coherent light beam. The slide is most transparent where the desired directivity is the greatest, and is least transparent where the directivity is the least. Phase information could also be impressed upon the coherent light beam by varying the optical thickness of the slide selectively, but generally this would not be done, and thus $f_w'$ would display constant phase.

Now $f_w'$, like $f_w$, is a function of x and y. Equations (2) and (3) show these variables to be proportional to the direction cosines l and m. Displacements in the input slide represent displacements in x and y, rather than angular displacements. Other than that, the input slide appears as a two-dimensional plot of the desired directivity pattern, with transparency of the slide representing the value of the pattern intensity.

Prior to taking the Fourier transform, the input must be modified so as to remove the cosine factor which appears in equation (13). This is accomplished by superimposing a second slide having an opacity proportional to the cosine squared value. Note that opacity and transmittance refer to intensities rather than amplitudes. The square root of the opacity should be made proportional to the cosine. Of course it is impossible to have an opacity less than one, and thus the cosine cannot be faithfully represented over the entire range of $-\pi/2$ to $+\pi/2$, but the behavior of the slide near the end points is of no consequences if $f_w'$ (which is represented by the first slide) is zero in those regions, which would normally be the case.

The pinhole array is used to impose the same conditions that the actual array antenna will impose. The relative spacing of the holes corresponds to the relative spacing of the elements of the array antenna. It may be possible to dispense with the pinhole array since the photocells of the electro-optical interface may provide samples which spatially correspond to the elements of the array antenna.

If the antenna elements are equally spaced and extend over a large area, and if G approximates an interpolation function (i.e., a properly-scaled sinc function), then the pattern produced by this simple control algorithm will approximate the desired pattern; otherwise a more complicated approach is required such as the following:

3.2 General Beam Forming

The inverse transform of (10) can be expressed as $$f_d(x,y)=g(x,y)\cdot h(x,y). \quad (16)$$

The factor g pertains to the elements alone, while the factor h pertains to the array. In a given array structure, g is usually fixed, as is that aspect of h that depends on the element locations.

If an arbitrary pattern is specified, say by $f_{a1}$, then we can define a corresponding h, $h_1$, as follows:

$$h_1 \equiv f_{a1}/g, \quad (17)$$

assuming g is non-zero. Modifying $h_1$ so that it portrays an actual array structure will, of course, modify the actual pattern that is obtained. In particular, if the transform of $h_1$ is replaced by a finite number of equally-spaced samples of itself, the resulting h, and hence the pattern, will be smoothed by a sinc function as well as being replicated:

$$\mathcal{F}^{-1}\{\text{rect}(X/A, Y/A)\cdot \text{comb}_s H(X,Y)\} = \text{sinc}(xA,yA) * \text{rep}_{1/s}\, h(x,y). \quad (18.)$$

The replication does not affect the radiated pattern if the sample spacing s is one-half wavelength or less, as h will then cover the range of $-1/\lambda$ to $+1/\lambda$ without replication, which represents the entire range of angle where radiation can occur. h evaluated outside of this range represents waves travelling in the plane of the aperture that do not contribute to the radiation pattern.

Figure 3:
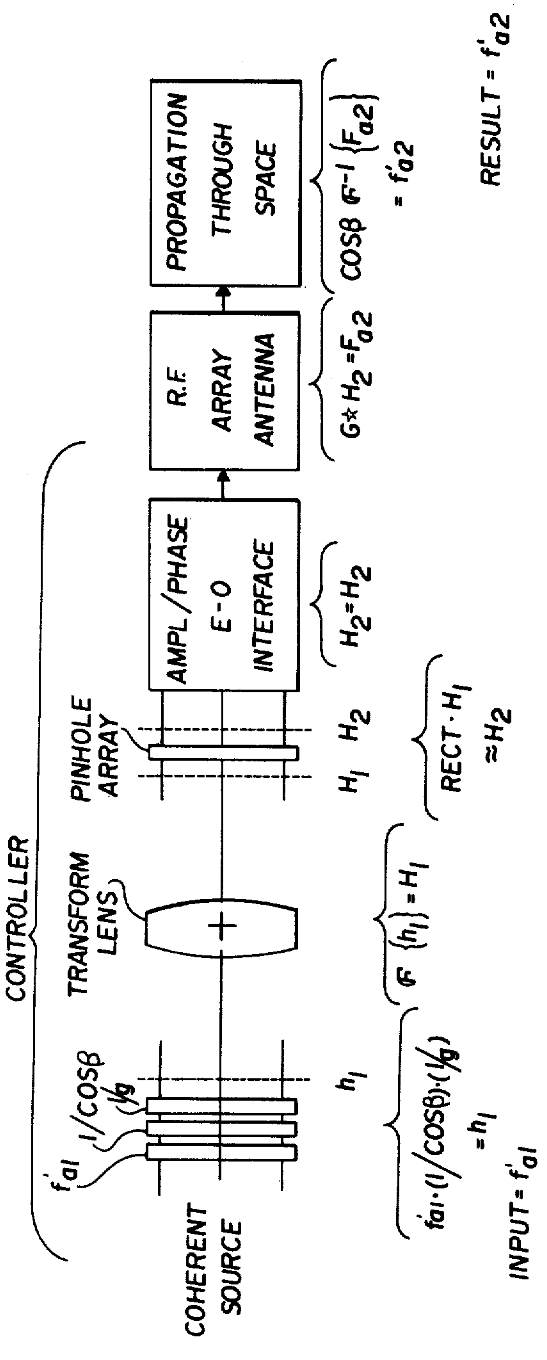
FIG. 3 is a block diagram of a more comprehensive embodiment of the antenna controller of the invention.

Consider the antenna controller depicted in FIG. 3. Here $f_{a1}'$ is the desired antenna pattern, while $f_{a2}'$ is the resulting pattern. The difference between the two arises from the sampling of $H_1$. $H_2$ is a finite sampled version of $H_1$, which means that the transform has been modified or degraded by a convolution with the sinc functions, as given by equation (18). For purposes of comparing radiation patterns, and assuming an element spacing of ½ wavelength or less, we may simplify the relationship between $h_2$ and $h_1$, to $$h_2 \approx \text{sinc}(xA,yA) * h_1 \quad (19)$$

Now in the system of FIG. 3, by definition, $$f_{a1}' \equiv f_{a1}\cdot\cos\beta, \text{ and} \quad (20)$$

$$f_{a2} \equiv f_{a2}'\cdot\cos\beta. \quad (21)$$

As before, $$f_{a1}=h_1\cdot g, \text{ and} \quad (22)$$

$$f_{a2}=h_2\cdot g. \quad (23)$$

From equations (19) through (23) we see that $$f_{a2} \approx \left[\frac{\text{sinc}(xA, yA) * h_1}{h_1}\right] f_{a1}, \quad (24.)$$

where $h_1 \neq 0$.

This shows the degradation imposed on the desired antenna pattern by the structure of the array, when the algorithm represented by FIG. 3 is employed.

3.3 Null Formation

The above approach appears to be reasonable when the direction in which energy is radiated is of prime importance. When the location of nulls (the directions in which very little energy is radiated) must be controlled, the algorithm may become ineffective because the convolution process (equation (24)) will tend to fill in any nulls present in the input desired pattern. Null constraints can be re-introduced at a later point in the processing, however, with some success.

Figures 4A, 4B:
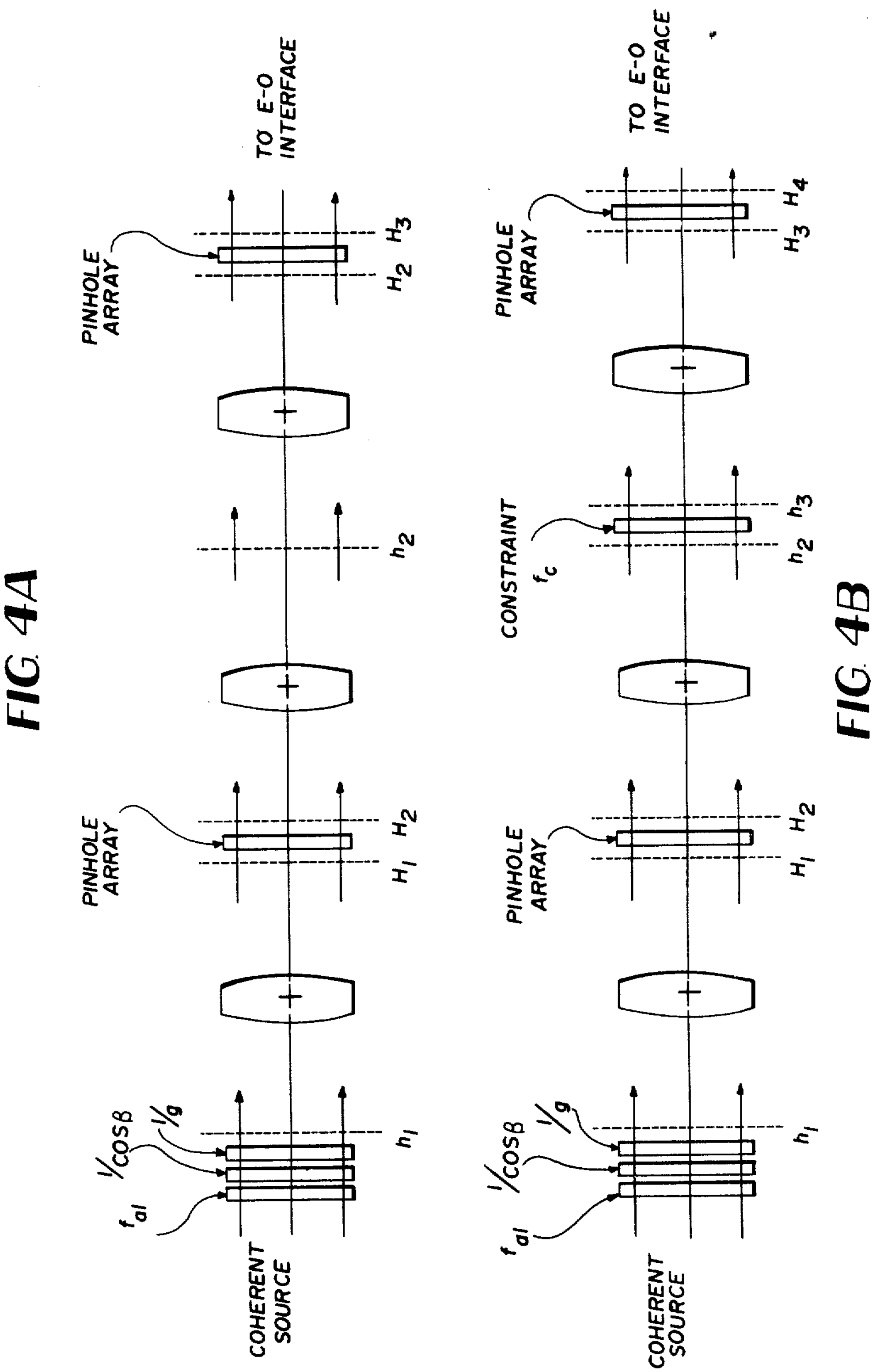
FIGS. 4A and 4B are block diagrams illustrating an antenna controller adapted for null formation.

First, let us examine the flow chart of FIG. 4A. It is obvious that the second pinhole array slide could simply be superimposed over the first, and the last two transform lenses could be eliminated, with the result that $H_2$ and $H_3$ become one and the same. Thus the system of FIG. (4A) performs identically to that of FIG. (3).

In FIG. 4B we have introduced a constraint in the form of a multiplicative function or slide in the plane of $h_2$. Now we have the following relationships:

$$h_3=h_2\cdot f_c, \text{ and} \quad (25)$$

$$h_4=h_3 * \text{sinc}(xA,yA), \quad (26)$$

where $f_c$ is the constraint that specifies the desired nulls.

If $f_c$ is in the form $1-f_d$, we have $$h_4=(h_2\cdot(1-f_d)) * \text{sinc}(xA,yA). \quad (27)$$

From equation (19) which applies here also, and from the realization that the self-convolution of a sinc function is the same sinc function, we find $$h_4=h_2-((h_2\cdot f_d) * \text{sinc}(xA,yA)). \quad (28)$$

If $f_d$ could be realized as a dirac function, $\delta(x-x_o, y-y_o)$; we would have $$h_4=h_2-h_2(x_o,y_o) * \text{sinc}(xA,yA). \quad (29)$$

Clearly at $x_o$, $y_o$ the function $h_4$ would be zero. The price paid for this null is the degradation in the nearby pattern caused by the substraction of the "sidelobes" of the sinc function.

In reality the dirac function can only be approximated, as by a narrow rect function for instance. Thus we set $$f_d = \text{rect}\ ((x-x_o)/r,\ (y-y_o/s)) \quad (30)$$

which has the effect of degrading the null somewhat, and lessening the degradation of the remainder of the pattern. The null depth can be examined by evaluating $h_4$ at $x_o, y_o$:

$$h_4/h_2 \approx 1-(\text{rect}((x-x_o)/r,(y-y_o)/s) * \text{sinc}\ (xA,yA)) \quad (31)$$

If the rect dimensions r and s are so small that $h_2$ is nearly constant inside the rect "pulse", $$(h_4/h_2)\Big|_{x_o,y_o} \approx 1 - \int_{-s/2}^{s/2}\int_{-r/2}^{r/2} \text{sinc}\ (xA,yA)\ dxdy. \quad (32.)$$

In order to evaluate the integral, it must be remembered that A is the length of the side of the array in the X-Y coordinate system (see equation (18)), while r and s are dimensions of the null area in the x-y coordinate system, which plots wavelength-normalized direction cosines (see equations (2) and (3). It is apparent that the depth of the null produced depends on the products sA and rA, which are dimensionless quantities. In general s and r will be constrained to small values so as not to interfere with the desired pattern, so that the null depth may be inadequate. Fortunately it is possible to implement a more severe constraining slide by introducing an optical phase-shifting element in that slide.

Consider the constraining function $$f_c = k-(1+k)\ \text{rect}\ ((x-x_o)/r,(y-y_o)/s), \quad (33)$$

where k is a constant less than unity. (Such a function might be implemented by coating a glass plate with an attenuating layer with transmittance $k^2$, and a phase shifting layer with a relative phase shift $\pi$ radius, both covering the entire plate except where the null is specified.) The equation corresponding to equation (32) is then $$(h_4 \cdot h_2)\Big|_{x_o,y_o} \approx k\left[1 - ((1+k)/k)\int_{-s/2}^{s/2}\int_{-r/2}^{r/2} \text{sinc}\ (xA,yA)dxdy\right] \quad (34.)$$

By properly adjusting k a true null can be formed, as is evident from the above. The pattern degradation suffered by the imposition of the null may be severe, as is to be expected when null formation is given priority. The nature of the degradation with this severe constraint is seen by substituting equations (33) and (25) into equation (26):

$$h_4 = kh_2-((1+k)\text{rect}((x-x_o)/r,(y-y_o)/s) * \text{sinc}\ (xA,yA)). \quad (35)$$

Perhaps a real appreciation of equation (35) can only be gained by examining realistic examples, and certainly the easiest way to examine the examples is through the use of the coherent optical processor, since two-dimensional transforms and convolutions are involved.

4. PROCESSOR CONSIDERATIONS

4.1 Equipment Scaling

The coherent optical processor introduces a scaling factor when taking the Fourier transform. In the normal configuration in which equi-phase planes are preserved, the input and transform planes are both spaced one focal length on either side of the transform lens. The resulting scaling is then given by $$x = \frac{u}{\lambda_o\sqrt{u^2+L^2}} \approx \frac{u}{\lambda_o L}, \text{ and} \quad (36.)$$

$$y = \frac{v}{\lambda_o\sqrt{v^2+L^2}} \approx \frac{v}{\lambda_o L}, \quad (37.)$$

where x and y are the mathematical transform variables, and u and v are the actual processor displacements, L is the transform lens focal length, and $\lambda_o$ is the optical wavelength.

When the processor is used to determine a Fourier transform, F(X,Y), the original function f(x,y) is actually input as a function of u and v, say p(u,v), which specifies the optical transmittance (and phase) of the input slide. The output transform appears as an optical intensity (and phase) in the actual coordinate system of the processor.

Of course the input function scale can be changed, with the resulting transform scale change given by the familiar relationship $$\}f(x/a,y/a)\} = a^2F(aX,aY). \quad (38)$$

In order to cover $\pm\pi/2$ radians in $\theta$, and o to $\pi$ radians in $\phi$, on an input slide of diameter D, we find (using equations (4), (5), (36) and (37))

$$a = 2(\lambda_o/\lambda)\ (L/D) \quad (39)$$

The resulting scale in the transform plane is illustrated by computing the physical separation in the processor corresponding to half-wave element spacing in the array antenna:

$$aX\Big|_{\lambda/2} = \lambda_o L/D. \quad (40.)$$

For example, an optical processor using a HeNe laser ($\lambda_o$=633 nm), and having a 12.5 mm diameter input slide and a 50-cm focal length lens, yields a scaled half-wave element spacing of 0.0253 mm, which is two pixels in the Reticon 32×32 matrix camera (8× auxilliary optics) which was used in the experimental set-up for recovering phase.

4.2 Electro-Optical Interface

The electro-optical interface shown in FIGS. 2 to 4 is a device for generating electrical signals indicative of the amplitude and phase of the spatially displaced beam samples inputted to the device. These electrical signals in the present invention control the excitation signals for the array antenna.

Any known electro-optical interface for performing the function described above may be used. One such device is illustrated in FIGS. 6 to 9, and is described below.

Figure 6:
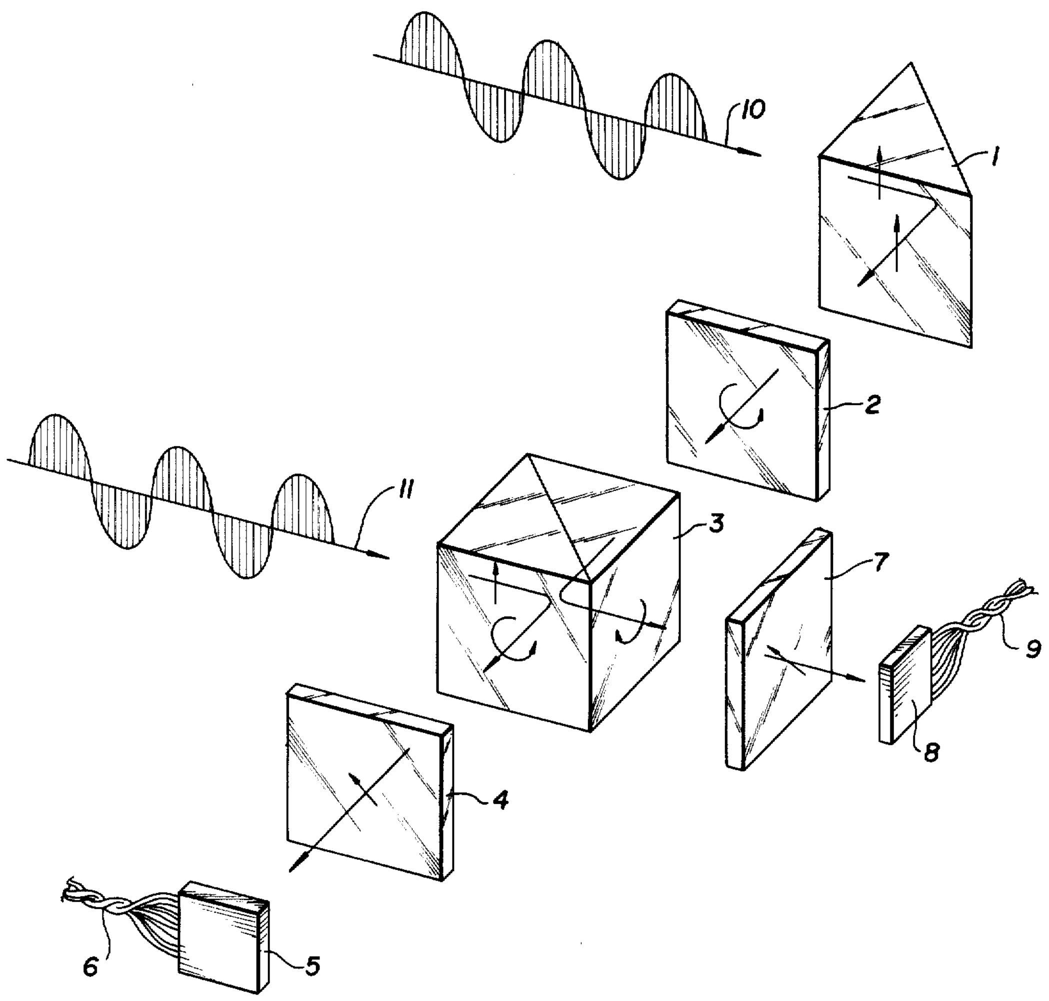
FIGS. 6, 7, 8 and 9 are drawings depicting one embodiment of an electro-optical interface which can be used in the optical processor of the invention.
Figure 7:
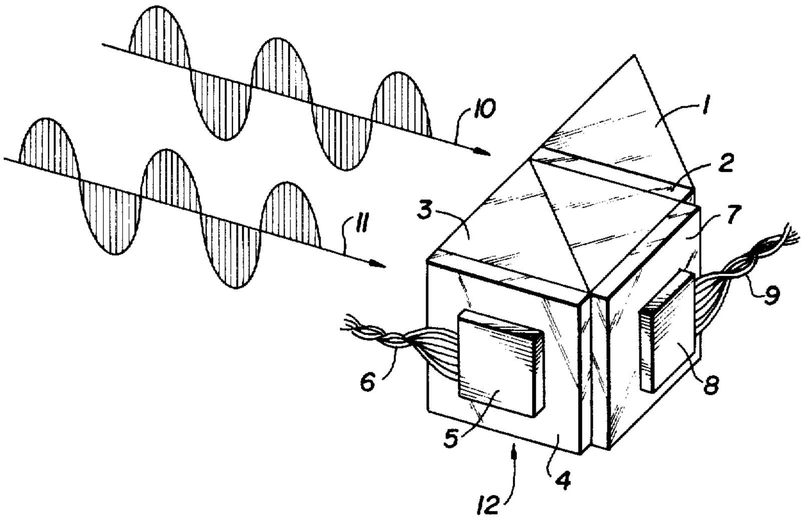

Referring to FIG. 6, signal beam 11 is the output of the pinhole array and comprises a plurality of thin pencil-like beams. It is desired to measure the amplitude and phase of each of the beams, and each beam after appropriate processing to be described below is arranged to be incident on a photocell of arrays 5 and 8.

Reference beam 10 is provided and is arranged to be coherent with signal beam 11, by, for instance, being derived from the same optical source as beam 11. The signal beam 11 is incident on cube beam splitter 3 which is arranged to direct a fraction of the beam energy directly through the beam splitter to polarizer 7 and photodetector array 8, and to reflect a like fraction of the beam energy to polarizer 4 and photodetector array 5.

The reference beam 10 is directed through quarter-wave plate 2 to beam splitter 3 by prism 1. If desired, the reference beam could be arranged to strike the quarter-wave plate directly so that the prism 1 would not be required. A fraction of the energy of the reference beam 10 passes directly through the beam splitter to the polarizer 4 and photodetector array 5, while a like fraction is reflected within the beam splitter to the polarizer 7 and photodetector array 8.

The signal beam and reference beam are assumed to be vertically polarized where they are incident upon the optical assembly, although any other plane polarization angle could be accommodated by proper orientation of the quarter-wave plate 2 and the polarizers 4 and 7. The reference beam is assumed to have a cross section large enough to illuminate the photodetector arrays 5 and 8 over their entire photosensitive surfaces, or at least over an area of interest. The reference beam is also assumed to be a plane wave, although if desired perturbations in the measured phase caused by a non-planar wave could be calibrated out of the system.

Again, referring to FIG. 6, the reference beam 10 is vertically polarized upon entering and upon exiting from the prism 1, as is indicated by the vertical arrows on the faces of the prism. The quarter-wave plate 2 is oriented so as to convert the plane-polarized reference beam into a circularly-polarized beam, as is indicated by the circular arrow on the face of the quarter-wave plate. The two polarizers 4 and 7 resolve the circularly-polarized beam into two plane-polarized beams which are $\pi/2$ radians out of phase. These polarizers are similarly oriented so that they pass light energy which is polarized at an angle of $\pi/4$ radians to the vertical, as is indicated by the slanted arrows on their faces. The relative phase shift occurs because the sense of the reference-beam polarization is reversed for the path through the beam splitter that includes a reflection, but not for the other path, as is indicated by the oppositely-directed circular arrows on the exit faces of the beam splitter. Thus, relative to the beams incident upon the polarizers, the polarizers have planes of polarization which are crossed, which results in beams exiting the polarizers which are plane polarized and relatively phase shifted by $\pi/2$ radians.

The signal beam 11 does not pass through a quarter-wave plate, and therefore it remains plane polarized. The signal beam incident upon each polarizer 4 and 7 has vertical polarization and therefore the beam exiting from each polarizer is attenuated but not relatively phase shifted.

Therefore, each photodetector array 5 and 8 has incident upon its photosensitive surface a combination of the signal beam and the reference beam, with the phase of the reference beam at one photodetector array being shifted $\pi/2$ radians with respect to the phase of the reference beam at the other array.

The interaction of the signal beam and the reference beam causes an interference pattern to be formed on the photodetector arrays, with different patterns being formed on the respective arrays because of the relative phase shift of the reference beam on the arrays. By measuring the intensity of the interference pattern at various points on the array, the amplitude and relative phase of the signal beam at those points can be determined.

It should be noted that one photodetector array sees a signal image which is reversed right-to-left with respect to that seen by the second photodetector array because of the reflection within the beam splitter in one optical path. A given sample point in the signal beam will therefore appear at different positions in the two photodetector arrays and this shift should be taken into account when the intensity measurements are paired for each sample point.

Figure 8:
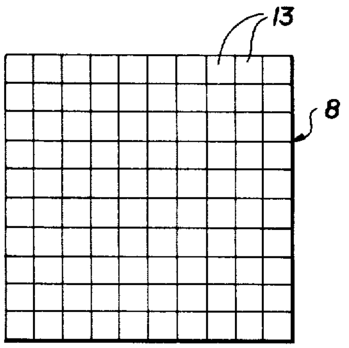
Figure 9:
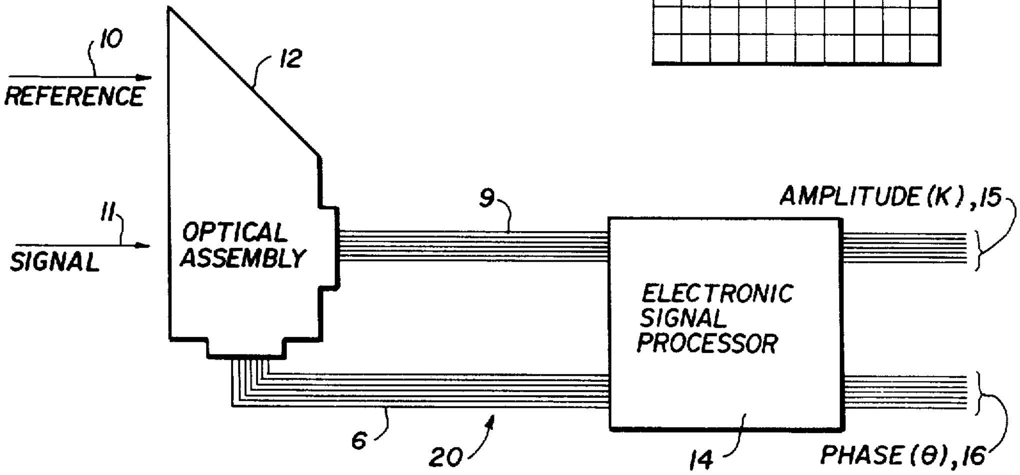

A typical photodetector array 8 is shown in FIG. 8 and is seen to be comprised of a matrix of cells 13. Photodetector arrays are commercially available in which the cells 13 are highly miniaturized, and in which each cell 13 can be considered to approximate a "point", and such highly miniaturized arrays are used in the system of the present invention.

To determine the desired information, let $R_1$ and $R_2$ be the instantaneous amplitudes of the combined signal and reference beams at a given sample point at the two photodetector arrays. All amplitude and intensity values are normalized so that the reference beam by itself would display unity peak amplitude at the photodetector arrays. If k is the peak signal amplitude at the sample point, and if $\phi$ is the signal phase relative to the reference beam at one photodetector array and $\phi-\pi/2$ is the signal phase relative to the reference beam at the other photodetector array then $$R_1^2=[\cos wt+k\cos(wt+\phi)]^2,+[\sin wt+k\sin(wt+\phi)]^2, \quad (41)$$

$$R_2^2=[\cos(wt+\pi 2)+k\cos(wt+\phi)]^2+[\sin(wt+\pi/2)+k\sin(wt+\phi)] \quad (42)$$

where w is the optical frequency in radians per unit time. The corresponding intensities can be found by squaring the amplitudes and integrating over the optical period T:

$$A_1=\frac{1}{T}\int_o^T\cdot R_1^2\,dt \quad (43.)$$

or $$A_1=l+k^2+2k\cos\phi, \quad (44.)$$

and $$A_2=\frac{1}{T}\int_o^T R_2^2\,dt \quad (45.)$$

or $$A_2=l+k^2+2k\sin\phi. \quad (46.)$$

Now $A_1$ and $A_2$ are the quantities directly measured by the photodetector arrays, while k and $\phi$ are the quantities sought. For convenience the results will be found in terms of $\theta$ instead of $\phi$, where $\theta\equiv\phi+\pi/4$. Obviously $\theta$ is just as appropriate a measure of relative phase as is $\phi$.

Let us define the sum S and the difference D by $S \equiv A_1 + A_2$, and $D \equiv A_1 - A_2$.

It then follows that $$k^2 = (\tfrac{1}{2}) S \pm \sqrt{S - (\tfrac{1}{4}) D^2 - 1}, \quad (47.)$$

and $$\cos \theta = D/(\sqrt{8}\ K). \quad (48.)$$

This can be seen by solving equations (44) and (46) for sin $\phi$, then substituting into the trigonometric formula $\sin^2 \phi + \cos^2 \phi = 1$.

By constraining the allowable input signal intensity so that $0 \leqq k \leqq \sqrt{\tfrac{1}{2}}$, the uncertainty of sign in equation (7) is removed, and we have $$k = \sqrt{(\tfrac{1}{2}) S - \sqrt{S - (\tfrac{1}{4}) D^2 - 1}}. \quad (49.)$$

This can be seen by expressing S in terms of k, sin $\phi$, and cos $\phi$, which then leads to $$S = 2(k^2 + 1) + \sqrt{8}\ K \sin \theta \quad (50.)$$

Imposing the constraint results in a limit on k given by $k \leqq (\tfrac{1}{2})S$, which forces the sign of the radical in equation (47) to be negative.

It is apparent that in any phase measuring device which employs continuous-wave signal and reference beams, there is an uncertainty in the number of whole cycles of phase that the signal exhibits. Thus the phase can only be expressed as a number of radians modulo $2\pi$. The number thus has a total range of $2\pi$. For convenience $\theta$ will be expressed here as angle which always lies in the range $-\pi$ to $\pi$. Equation (48) can then be expressed as $$\theta = \arccos (D/(\sqrt{8}\ k)), \text{ for } S \geqq 2(k^2 + 1.)$$
$$= -\arccos (D/(\sqrt{8}\ k)), \text{ for } S < 2(k^2 + 1). \quad (51.)$$

The relationship between the value of S and the sign of the angle $\theta$ can be seen by examining equation (50) with positive and negative angles.

Thus, all the relationships required for determining k and $\theta$ under the constraint $0 \leqq k \leqq \sqrt{\tfrac{1}{2}}$ have been given above. The routine for computing k and $\theta$ from photodetector array signals $A_1$ and $A_2$ is to form the sum and differences S and D, compute k by the mathematical operations given by equation (49) compare the value of S with the computed $2(k^2+1)$, and perform the appropriate computations for finding $\theta$ as given in equation (51).

While it is possible to perform the above computations by hand, the use of a computer, for example a microprocessor is preferred. An electronic processor 14 is pictorially depicted in FIG. 5, and is connected to optical assembly 12 by cables 6 and 9. The above-described series of mathematical operations is a routine programming problem, and a program to perform the operations could easily be devised by one skilled in the art. The outputs of processor 14 would most conveniently be in parallel form, and would be fed to control the corresponding elements of the array antenna.

4.2 Possible Refinements

Figure 5:
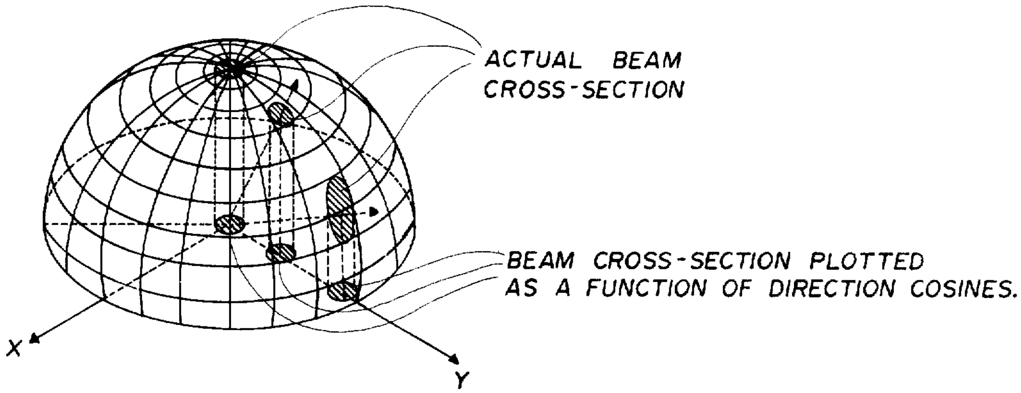
FIG. 5 is an illustration which is useful in understanding beamshape distortion.

In re-directing an antenna beam of some desired characteristics, we have a choice of inputs to the optical processor. In the approach which produces an output comparable to that which is usually obtained by digital computer, the directivity pattern defining beam configuration (as opposed to pointing direction) is kept constant when expressed in terms of x and y (or direction cosines). This is implemented in the optical processor by a slide which is merely translated in x and y in order to effect beam steering. This translation produces a linear phase shift in the aperture distribution, which will re-direct the beam, but which will also distort the beam shape as depicted in FIG. 5.

In another approach we could attempt to keep beam shape constant for all pointing directions within a wide region. This is successful only when the normally-directed or on-axis beam does not fully exploit the capabilities of the array. Here we modify the input function as we re-direct it in order to compensate for the geometric distortion. This could be implemented in the optical processor by configuring the input slide as a spherical segment, and rotating the segment about the center of the sphere instead of translating it. A consideration of FIG. 5. will show that the projection of this slide onto the input plane is just the correction required to negate the distortion. Some error is introduced in the processor because the actual input-to-lens distance does not remain constant. This can be reduced by use of a long focal-length transform lens.

As a consequence of this input configuration, the output aperture distribution displays higher derivatives and maintains significant amplitude over a greater area as the beam is steered further off-axis. In practice, the antenna aperture and element spacing are constrained, which generally results in increased side-lobe level and ultimately in multiple beams or "grating lobes".

We wish it to be understood that we do not desire to be limited to the exact details of construction shown and described, for obvious modifications can be made by a person skilled in the art.

I claim:

1. An apparatus for causing an array antenna to transmit a selected antenna pattern, said array antenna having a plurality of array elements comprising,
   - a first transparency which varies in transmittance in accordance with a parameter of said selected antenna pattern,
   - optical processor means including both means for directing a coherent light beam through said transparency so that said beam is spatially modulated by said variation in transmittance and means for taking the Fourier transform of said modulated beam, thus forming a resultant beam,
   - means for providing electrical signals corresponding to the amplitude and/or phase of a plurality of spatially displaced samples of said resultant beam, said samples corresponding in relative spacing to the elements of said array antenna, and
   - means for exciting the elements of said array antenna with said electrical signals.

2. The apparatus of claim 1, wherein said parameter of said selected antenna pattern is directivity.

3. The apparatus of claim 2, wherein said and said means for taking the Fourier transform of said modulated beam comprises a lens.

4. The apparatus of claim 3 wherein said means for providing electrical signals corresponding to a plurality of spatially displaced samples includes a pinhole array means.

5. The apparatus of claim 4 further including a second transparency, located between said first transparency and said lens, said second transparency ideally spatially varying in transmittance in accordance with a cosine function.

6. The apparatus of claim 5 further including means for producing a null in said selected antenna pattern.

7. The apparatus of claim 6 wherein said means for producing a null includes a further transparency having an opaque spot, said further transparency being disposed in the same optical path as said pinhole array means, but being separated from said array means by lens means.

* * * * *